United States Patent [19]
Taubner et al.

[11] Patent Number: 5,196,234
[45] Date of Patent: * Mar. 23, 1993

[54] METHOD FOR PREPARING ZINC ORTHOSILICATE PHOSPHOR PARTICLE

[75] Inventors: Fred R. Taubner, Danvers; A. Gary Sigai, Lexington, both of Mass.; Charles F. Chenot, Towanda; Henry B. Minnier, Dushore, both of Pa.

[73] Assignee: GTE Products Corporation, Danvers, Mass.

[*] Notice: The portion of the term of this patent subsequent to Feb. 23, 2010 has been disclaimed.

[21] Appl. No.: 917,724

[22] Filed: Jul. 20, 1992

Related U.S. Application Data

[63] Continuation of Ser. No. 762,154, Sep. 17, 1991, abandoned, which is a continuation of Ser. No. 666,460, Mar. 5, 1991, abandoned, which is a continuation of Ser. No. 587,589, Sep. 24, 1990, abandoned, which is a continuation of Ser. No. 902,252, Aug. 29, 1986, abandoned.

[51] Int. Cl.$^5$ .............................................. C09K 11/59
[52] U.S. Cl. .............................. 427/213; 252/301.5; 252/301.6 F; 427/67; 427/215
[58] Field of Search ............... 252/301.6 F, 301.4 F, 252/301.5; 427/213, 215, 67

[56] References Cited

U.S. PATENT DOCUMENTS

| | | | |
|---|---|---|---|
| 2,109,984 | 3/1938 | Aicher | 91/70 |
| 2,129,096 | 9/1938 | Leverenz | 252/301.6 F |
| 2,151,496 | 3/1939 | Beese | 176/122 |
| 2,206,280 | 7/1940 | Froelich | 250/81 |
| 2,210,087 | 8/1940 | Leverenz | 250/81 |
| 2,222,509 | 11/1940 | Isenberg | 250/81 |
| 2,241,939 | 5/1941 | Aschermann | 250/81 |
| 2,245,414 | 6/1941 | Roberts | 250/81 |
| 2,247,192 | 6/1941 | Fonda | 250/81 |
| 2,309,676 | 2/1943 | Schmidling | 176/122 |
| 2,386,277 | 10/1945 | Smith | 176/122 |
| 2,457,054 | 12/1948 | Leverenz | 252/301.6 F |
| 2,554,999 | 5/1951 | Merrill | 252/301.6 F |
| 2,656,310 | 10/1953 | Nagy et al. | 252/301.6 F |
| 3,114,067 | 12/1963 | Henderson | 313/109 |

(List continued on next page.)

FOREIGN PATENT DOCUMENTS

| | | |
|---|---|---|
| 3408237 | 9/1985 | European Pat. Off. . |
| 85104456.0 | 11/1985 | European Pat. Off. . |
| 2450435 | 4/1976 | Fed. Rep. of Germany . |
| 52-22579 | 2/1977 | Japan . |
| 52-22584 | 2/1977 | Japan . |
| 52-22586 | 2/1977 | Japan . |
| 1343250 | 6/1972 | United Kingdom . |

OTHER PUBLICATIONS

W. Lehmann, "An Analysis of Color-Changing Penetration-type Cathodoluminescent Phosphor Screens", J. Electrochem. Soc.: Solid State Science and Technology, 128 (8): 1787 (1981).

(List continued on next page.)

Primary Examiner—Jack Cooper
Attorney, Agent, or Firm—Robert E. Walter

[57] ABSTRACT

A method for preparing a specific zinc orthosilicate phosphor particle having a nonparticulate, conformal aluminum oxide coating wherein all of a manganese activator is present as manganese (II) and occupies zinc (II) sites includes the steps of blending a zinc source, a manganese (II) source, a silicon source, and a tungsten source in amounts in accordance with said formula with an amount of up to about 2 weight percent NH$_4$Cl and up to about 0.2 weight percent NH$_4$F to form a relatively uniform admixture, firing the mixture in a closed container under an inert non-oxidizing atmosphere to promote retention of manganese in the plus two valance state whereby oxidation of manganese to a higher valence state is avoided and conditions promote larger particle size formation; milling and washing the phosphor in an aqueous citric acid solution to remove unreacted manganese; rinsing, drying and sieving the dried phosphor; and depositing a continuous, nonparticulate, conformal aluminum oxide coating on the dried phosphor particle.

12 Claims, 3 Drawing Sheets

U.S. PATENT DOCUMENTS

| | | | |
|---|---|---|---|
| 3,157,602 | 11/1964 | Rapp | 252/301.6 F |
| 3,416,019 | 12/1968 | Kaduk | 313/109 |
| 3,535,267 | 10/1970 | Sarver | 252/301.6 F |
| 3,886,396 | 5/1975 | Hammer et al. | 313/486 |
| 3,939,377 | 2/1976 | Ignasiak | 313/468 |
| 3,963,639 | 6/1976 | Klein | 252/301.36 |
| 3,995,191 | 11/1976 | Kaduk et al. | 313/485 |
| 4,208,448 | 6/1980 | Panaccione | 427/67 |
| 4,315,190 | 2/1982 | Peters et al. | 313/467 |
| 4,390,449 | 6/1983 | Peters et al. | 252/301.6 F |
| 4,396,863 | 8/1983 | Ranby et al. | 313/486 |
| 4,459,507 | 7/1984 | Flaherty | 313/489 |
| 4,551,397 | 11/1985 | Yaguchi et al. | 428/691 |
| 4,585,673 | 4/1986 | Sigai | 427/213 |
| 4,639,637 | 1/1987 | Taubner | 313/489 |
| 4,670,688 | 6/1987 | Sigai et al. | 313/489 |
| 4,728,459 | 3/1988 | Fan et al. | 252/301.6 F |
| 4,892,757 | 1/1990 | Kasenga et al. | 252/301.6 F |
| 4,925,703 | 5/1990 | Kasenga et al. | 252/301.4 F |
| 4,956,202 | 9/1990 | Kasenga et al. | 252/301.4 F |
| 5,039,449 | 8/1991 | Peters et al. | 252/301.6 F |

OTHER PUBLICATIONS

N. M. Korablev et al., "Kinetics of Formation of a Phosphor Based on Zinc Orthosilicate", J. Applied Chem. of U.S.S.R. 52(a), Part I, 1855–1859 (1979).

D. E. Harrison, "Relation of Some Surface Chemical Properties of Zinc Silicate Phosphor to its Behavior in Fluorescent Lamps", J. Electrochem. Soc. 107 (3), 210–217 (1960).

Takamori et al., "Phase Transitions and Thermoluminescence of a Plasma-Sprayed Zinc Silicate Phosphor," Comm. of American Ceramic Soc., C–127 et seq., Aug. 1983.

E. F. Lowry, "The Long-Term Deterioration in Certain Phosphors Exposed to the Low Pressure Mercury Arc", Trans. Electrochem. Soc. 95(5), 242 (1949).

Leverenz, "Synthesis of Luminescent Solids (Phosphors)–Synthesis and Symbolism of Phosphors", pp. 68–69.

Leverenz, "Solid (Crystals)–Growth of Real Crystals", pp. 48–49.

Uehara et al., "A Study of Fluorescent Substances (The 8th Report)–in a Fluorescent Spectrum of $ZnO-SiO_2$ Group Fluorescent Materials", J. Chem. Soc. Japan 61, 907–918 (1940).

Hurd et al., "J. of Vacuum Science & Technology", vol. 13, No. 1, pp. 410–413 (1976).

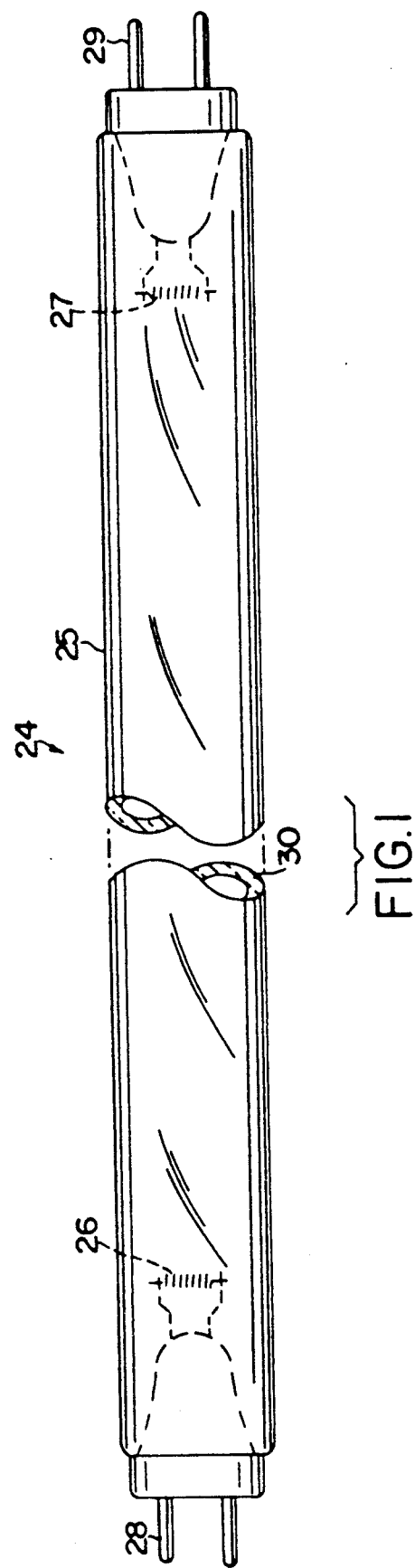

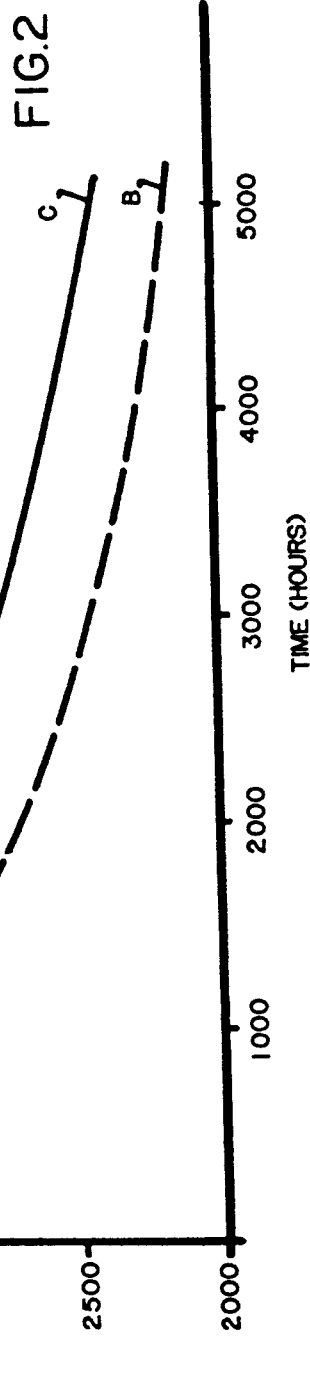

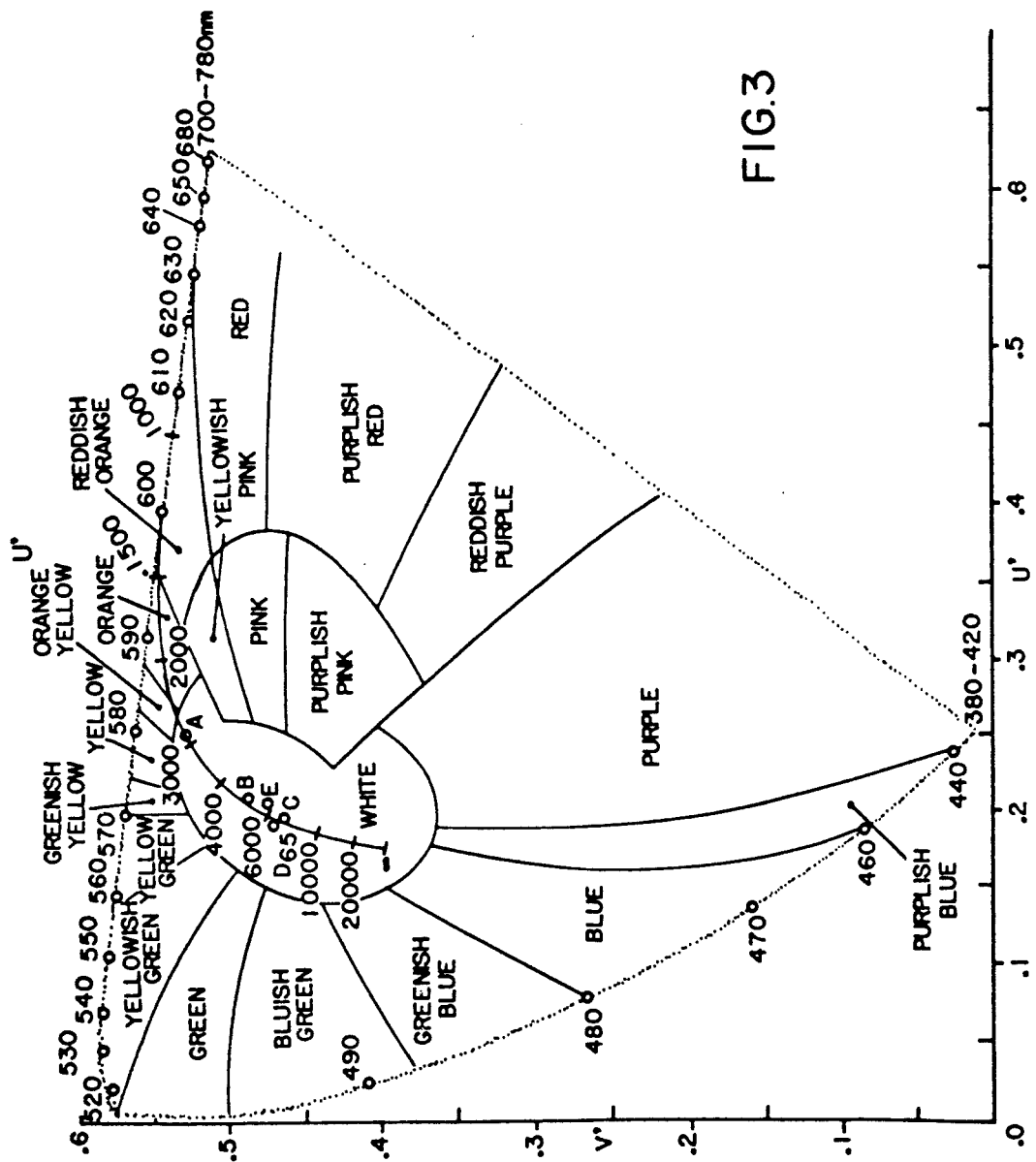

METHOD FOR PREPARING ZINC ORTHOSILICATE PHOSPHOR PARTICLE

This is a divisional of co-pending application Ser. No. 07/762,154 filed on Sep. 17, 1991, which is a continuation of copending application Ser. No. 07/666,460 filed on Mar. 5, 1991, which is a continuation of Ser. No. 07/587,589, filed Sep. 24, 1990, which is a continuation of U.S. Ser. No. 06/902,252, filed Aug. 29, 1986, all now abandoned.

CROSS-REFERENCE TO RELATED APPLICATION

This application is related to the application of C. F. Chenot and H. B. Minnier for "Improved Zinc Orthosilicate Phosphor", filed Jul. 24, 1992 as Ser. No. 07/865,732.

BACKGROUND OF THE INVENTION

This invention relates to fluorescent lamps and fluorescent lamp phosphors. More particularly, this invention is concerned with the improved performance of fluorescent lamps which include manganese-activated zinc orthosilicate phosphor.

Manganese-activated zinc orthosilicate phosphor ($Zn_2SiO_4$:Mn) is a green-emitting phosphor. One of the problems associated with $Zn_2SiO_4$:Mn is its relatively poor fluorescent lamp performance and maintenance. Poor maintenance means that the light output, or lumens per watt, of the phosphor decreases to a greater extent during lamp life than is desirable. Because of its relatively poor fluorescent lamp maintenance, $Zn_2SiO_4$:Mn phosphor has been generally found to be unsuitable for use as a green-emitting phosphor in commercially available fluorescent lamps. Heretofore, commercially available fluorescent lamps which include green-emitting phosphors have typically employed expensive rare earth green-emitting phosphors, such as cerium terbium magnesium aluminate.

The importance of high-performance, green-emitting phosphors with low depreciation characteristics in fluorescent lamps has increased in recent years with the growing demand for high CRI performance lamps. For that reason a fluorescent lamp including a less expensive high-maintenance green-emitting phosphor is desirable.

SUMMARY OF THE INVENTION

These and still further objects features, and advantages of the invention are achieved, in accordance herewith, by providing a phosphor particle having a continuous aluminum oxide coating surrounding its outer surface, said phosphor being a manganese-activated zinc orthosilicate phosphor having the empirical formula:

$$Zn_{(2.00-x-y)}Mn_xSiO_{(4.00-y)}(WO_3)_z$$

wherein:
$0.04 \leq x \leq 0.15$;
$0 \leq y \leq 0.05$; and
$0 \leq z \leq 0.002$.

In accordance with another aspect of the present invention there is provided a fluorescent lamp comprising a glass envelope wherein the inner wall of the glass envelope is coated with a coating comprising one or more layers of phosphor, at least one of the phosphor layers including a phosphor component comprising particles of manganese-activated zinc orthosilicate phosphor having the empirical formula:

$$Zn_{(2.00-x-y)}Mn_xSiO_{(4.00-y)}(WO_3)_z$$

wherein:
$0.04 \leq x \leq 0.15$;
$0 \leq y \leq 0.05$; and
$0 \leq z \leq 0.002$,
the particles of manganese-activated zinc orthosilicate phosphor being individually coated with a continuous coating of aluminum oxide.

In accordance with still another aspect of the present invention there is provided a white-emitting phosphor blend comprising a green-emitting phosphor component, said green-emitting phosphor component comprising particles of manganese-activated zinc orthosilicate phosphor having the empirical formula:

$$Zn_{(2.00-x-y)}Mn_xSiO_{(4.00-y)}(WO_3)_z$$

wherein:
$0.04 \leq x \leq 0.15$;
$0 \leq y \leq 0.05$; and
$0 \leq z \leq 0.002$,
the particles of manganese-activated zinc orthosilicate phosphor being individually coated with a continuous coating of aluminum oxide.

BRIEF DESCRIPTION OF THE DRAWINGS

In the drawings:

FIG. 1 is a diagrammatic elevational view of a fluorescent lamp.

FIG. 2 graphically represents lumen output as a function of time for a lamp test series, including lamps in accordance with the present invention.

FIG. 3 illustrates the CIE 1976 UCS Chromaticity Diagram.

For a better understanding of the present invention, together with other and further objects, advantages and capabilities thereof, reference is made to the following disclosure and appended claims in connection with the above-described drawing.

DETAILED DESCRIPTION

In accordance with the present invention, it has been found that particles of manganese-activated zinc orthosilicate phosphor having the empirical formula:

$$Zn_{(2.00-x-y)}Mn_xSiO_{(4.00-y)}(WO_3)_z$$

wherein
$0.04 \leq x \leq 0.15$;
$0 \leq y \leq 0.05$: and
$0 \leq z \leq 0.002$
which have been individually and continuously coated with a conformal aluminum oxide coating provide a green-emitting phosphor material having maintenance and lumen characteristics suited for use in fluorescent lamps and phosphor blends.

The phosphor particle substrate of the present invention is the substantially stoichiometric manganese-activated zinc orthosilicate phosphor which is the subject of U.S. patent application Ser. No. 07/865,732; filed on Jul. 24, 1992, and having a parent application of C. F. Chenot and H. B. Minnier filed on even date herewith. The phosphor substrate includes the following elements in the specified weight percent ranges:

zinc, from about 54.06% to about 57.60% by weight;
silicon from about 12.60% to about 12.93% by weight;
manganese, from about 0.98% to about 3.79% by weight;
tungsten from about 0% to about 0.169% by weight; and
oxygen, from about 28.76% to about 29.10% by weight (by difference).

The phosphor substrate can also be defined and identified by its cation composition. The cation composition of the substantially stoichiometric manganese-activated zinc orthosilicate phosphor substrate of the present invention comprises:

a zinc concentration from about 54.06% to about 57.60% by weight:

a silicon concentration from about 12.60% to about 12.93% by weight, a manganese concentration from about 0.98% to about 3.79% by weight, and a tungsten concentration from about 0% to about 0.169% by weight.

The term "cation", as used to describe elements present in the phosphor substrate, means the elements present in the phosphor substrate other than oxygen.

These compositional limits can also be defined in terms of the empirical formula:

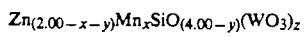

$$Zn_{(2.00-x-y)}Mn_xSiO_{(4.00-y)}(WO_3)_z$$

wherein:
$0.04 \leq x \leq 0.15$
$0 \leq y \leq 0.05$
$0 \leq z \leq 0.002$.

In the formulation, the nonstoichiometry parameter (Y) has been limited to only a small deviation from the ideal stoichiometry of $(Zn+Mn)/Si=2.00$, i.e., from 1.95/1 to 2.00/1. At the prescribed upper limit of $y=0.05$ the amount of excess silica ($SiO_2$) computes to less than 0.7 weight percent, which is a reasonable tolerance keeping the negative feature of excess silica to a minimum. As used herein, "substantially stoichiometric" describes a phosphor in which the nonstoichiometry parameter y is greater than or equal to zero and less than or equal to 0.05, preferably, the nonstoichiometry parameter (y) is greater than or equal to zero and less than or equal to 0.03. Most preferably, y equals zero, signifying the ideal stoichiometry of $(Zn+Mn)/Si=2.00$.

Tungsten, in the form of $WO_3$, can optionally be incorporated into the zinc silicate phosphor substrate of the present invention. The $WO_3$ addition is represented by the parameter z in the empirical formula. The amount of $WO_3$ per formula unit is greater than or equal to zero and less than or equal to 0.002 mole.

The manganese concentration (x) is varied over a range of from about 0.04 to about 0.15 moles per formula unit, which range includes the concentration resulting in optimum luminescence performance. Optimum luminescence has been demonstrated for phosphor compositions in which x is from about 0.11 to about 0.12 by intrinsic powder fluorescence evaluation and by actual lamp evaluation in 40 Watt T12 fluorescent lamps.

Except for the manganese contents, which were in accordance with the values reported in Table I, the phosphor compositions used to obtain the data reported in Table I were otherwise formulated and prepared by a method similar to the method described in Example III.

In Table I, comparison is made between the calculated weight % Mn concentration for an Mn concentration series and the actual Mn concentration determined by postfiring quantitative analysis. The close parallel of these data indicates that the final composition is accurately represented by the empirical formula.

TABLE I

| Value of x | Calculated wt % Mn | Analyzed wt % Mn |
|---|---|---|
| 0.0457 | 1.13 | 1.2 |
| 0.0575 | 1.42 | 1.5 |
| 0.0724 | 1.79 | 1.7 |
| 0.0911 | 2.26 | 2.2 |
| 0.1147 | 2.84 | 2.8 |
| 0.1444 | 3.58 | 3.5 |

The empirical formula of a preferred phosphor composition for use as a substrate in the present invention is one in which $0.11 \leq x \leq 0.12$, $0 \leq y \leq 0.03$, and $z=0.001$.

The above-described preferred phosphor composition comprises the following cation composition:

zinc, from about 55.13 to about 55.68 percent by weight;

manganese, from about 2.72 to about 3.01 percent by weight;

silicon, from about 12.66 to about 12.81 percent by weight; and tungsten, from about 0.828 to about 0.0838 percent by weight.

The oxygen content of the above-described preferred composition, determined by difference is from about 28.86 to about 28.97 percent by weight.

The synthesis of the improved willemite is dominated by a substantially stoichiometric formulation; a predetermined admix of $NH_4Cl$ and $NH_4F$ salts at a ratio adjusted to achieve the desired particle growth and clarity (definition); a closed container, for example, an alumina crucible fitted with a relatively tightly fitted alumina lid, or similar closed refractory reaction vessel; a single step heat treatment in an inert gas furnace atmosphere; and a final mill/wash treatment of the phosphor in a weak citric acid. Preferably, the single step heat treatment includes a rapid heat-up profile. While not wishing to be bound by theory, it is believed that a rapid heat-up profile promotes and assists the proposed vapor transport mechanism of the present method. Advantageously the heat-up profile should be sufficiently fast for reaction to occur between the reactants in the gaseous state. If the heat-up profile is too slow, the gaseous reactants may dissipate from, or leave the reaction vessel before the desired reaction occurs. If, alternatively, the heat-up profile is too fast, the reaction container may undergo structural deterioration, such as, cracking, and the like. Preferably, the heat-up time for a temperature increase of, for example, from 700° to 1250° C., is in the range of from about 30 minutes to about 1 hour.

In other words, as used herein, a rapid heat-up profile calls for heating the reactants within the closed container at a temperature rate sufficient for reaction to occur between the gaseous reactants before gaseous reactants diffuse out of the closed container.

The preparation of the phosphor includes the use of strategic amounts of ammonium halide salts, namely: ammonium chloride ($NH_4Cl$) and ammonium fluoride ($NH_4F$), in combination with covered refractory reaction vessels, and an inert furnace atmosphere. Preferably, a slow dynamic flow of nitrogen gas is employed in the furnace, e.g., a linear flow rate from 0.2 to 0.5 liters nitrogen per minute per cm$^2$ (i.e., from 200 to 500 cm/min.)

While not wishing to be bound by theory, the reaction mechanism involving ammonium halide salts is believed to promote and assist the formation of an MnSiO$_3$ intermediate via a vapor transport mechanism, as demonstrated below:

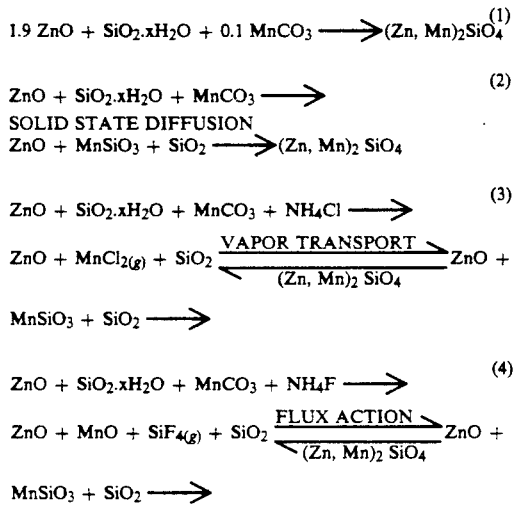

Equation (I) represents the overall reaction for formation of the phosphor for use as a substrate in the present invention. Equations (2)–(4) demonstrate the steps of the reaction mechanism involved in the foregoing method. (Equations (2)–(4) are not balanced.)

The ammonium halide additions perform various functions. The ammonium chloride and ammonium fluoride purge the crucible load of air and/or O$_2$, thereby preserving manganese as a divalent ion. The ammonium chloride causes rapid vapor transport of Mn; enhances the overall reaction, maintains the divalent Mn ion; and causes limited particle growth or fluxing action. The ammonium fluoride causes some vapor transport of manganese and severe fluxing action, resulting in significant particle growth. The use of ammonium chloride in combination with very small amounts of ammonium fluoride provides controlled particle growth with high reactivity.

The concentration range of the ammonium halide additions to the unfired formulations are summarized as follows:
0 < wt % NH$_4$Cl ≦ 2.0
0 < wt % NH$_4$F ≦ 0.2.
Amounts of NH$_4$Cl from about 0.5 to about 1.0 weight percent and of NH$_4$F from about 0.02 to about 0.06 weight percent ar considered optimum to achieve high-performance zinc silicate phosphor with a preferred particle size in the range of 5 ≦ FSSS ≦ 6. (FSSS is the abbreviation for Fisher Sub-Sieve Size: FSSS units are designated in micrometers.)

Examples of the particle size variation and control as a function of the ammonium halide additions are shown in Table II. (With the exception of the amount of NH$_4$Cl and NH$_4$F used, which were in accordance with the values reported in Table II, the phosphor compositions of samples C, E, and F were otherwise formulated and prepared by a method similar to that described in Example III.)

TABLE II

| Sample | Wt % NH$_4$Cl | Wt % NH$_4$F | Typical Particle Size (FSSS) |
|---|---|---|---|
| A | 0.5 | 0 | 2.5–3.0 without W |
| B | 0.5 | 0 | 3.6–5.2 with W |
| C | 0.475 | 0.025 | 6.0 with W |
| D | 0.45 | 0.05 | 6.7 with W |
| E | 0.40 | 0.10 | 8.7 with W |
| F | 0.35 | 0.15 | 8.7 with W |

The following examples are given to further illustrate the preparation of the substantially stoichiometric manganese-activated zinc orthosilicate phosphor substrate. These examples are intended merely as being illustrative and representative of the method by which the phosphor substrate can be prepared.

EXAMPLE I

This example is directed to the preparation of improved manganese-activated zinc orthosilicate, as represented by Sample A in Table II, employing NH$_4$Cl as the only ammonium halide addition to the starting formulation.

The following starting materials were used in the present example. The relative mole amounts (i.e., the moles per formula unit) and corresponding numbers of grams per batch for each of the starting materials are as follows:

|  | Rel. Moles | g/batch |
|---|---|---|
| Zinc Oxide | 1.8852 | 153.40 |
| Silicic Acid (approx. 87% SiO$_2$) | 1.000 | 69.35 |
| MnCO$_3$ (approx. 47% Mn) | 0.1147 | 13.34 |
| NH$_4$Cl | 0.0221 | 1.180 |

These raw materials were thoroughly blended and fired in covered alumina crucibles in a furnace programmed to ramp from about 700° C. to 1250° C. within 30 minutes, hold at 1250° C. for about 2–3 hours, and ramp down to 700° C. in about 60 minutes.

The fired material was then subjected to a mill/wash treatment where the material was ball milled in a weak citric acid solution (about 0.2% citric acid (HO(CH$_2$CO$_2$H)$_2$CO$_2$H) per unit of phosphor powder) for about 30 minutes to 1 hour. The mill/washed material was then dewatered and dried.

EXAMPLE II

This example is directed to the preparation of improved manganese-activated zinc orthosilicate, as represented by Sample B in Table II, including employing WO$_3$ and NH$_4$Cl as the only ammonium halide addition to the starting formulation.

The following starting materials were used in the present example. The relative mole amounts (i.e., the moles per formula unit) and corresponding numbers of grams per batch for each of the starting materials are as follows:

|  | Rel. Moles | g/batch |
|---|---|---|
| Zinc Oxide | 1.8852 | 153.40 |
| Silicic Acid (approx. 87% SiO$_2$) | 1.0000 | 69.35 |

-continued

|  | Rel. Moles | g/batch |
|---|---|---|
| MnCO$_3$ (approx. 47% Mn) | 0.1147 | 13.34 |
| NH$_4$Cl | 0.0221 | 1.180 |
| WO$_3$ | 0.0011 | 0.255 |

These materials were blended, fired and mill/washed in a manner similar to the procedure presented in Example I.

EXAMPLE III

This example is directed to the preparation of improved manganese-activated zinc orthosilicate as represented by Sample D in Table II involving WO$_3$, and employing both NH$_4$Cl and NH$_4$F as the ammonium halide additions to the starting formulation.

The following starting materials were used in the present example. The relative mole amounts (i.e., the moles per formula unit) and corresponding numbers of grams per batch for each of the starting materials are as follows:

|  | Rel. Moles | g/batch |
|---|---|---|
| Zinc Oxide | 1.8852 | 153.40 |
| Silicic Acid (approx. 87% SiO$_2$) | 1.000 | 69.35 |
| MnCO$_3$ (approx. 47% Mn) | 0.1147 | 13.34 |
| NH$_4$Cl | 0.0199 | 1.062 |
| NH$_4$F | 0.0032 | 0.118 |
| WO$_3$ | 0.0011 | 0.255 |

These materials were blended, fired and mill/washed in a manner similar to the procedure presented in Example I.

EXAMPLE IV

This example is directed to the preparation of improved manganese-activated zinc orthosilicate similar to Sample D in Table II, involving WO$_3$, NH$_4$Cl and NH$_4$F, with the exception that the NH$_4$Cl addition is approximately doubled to accommodate larger scale crucibles and furnace equipment.

The following starting materials were used in the present example. The relative mole amounts (i.e., the moles per formula unit) and corresponding numbers of kilograms per batch for each of the starting materials are as follows:

|  | Rel. Moles | kg/batch |
|---|---|---|
| Zinc Oxide | 1.8852 | 30.68 |
| Silicic Acid (approx. 87% SiO$_2$) | 1.000 | 13.81 |
| MnCO$_3$ (approx. 47% Mn) | 0.1147 | 2.68 |
| NH$_4$Cl | 0.0438 | 9.469 |
| NH$_4$F | 0.0038 | 0.282 |
| WO$_3$ | 0.0011 | 0.054 |

These materials were blended, fired, and mill/washed in a manner similar to the procedure presented in Example I, except that the formulation is designed for larger scale firing procedures as, for example, a continuous furnace where the temperature time profile is analogous to the temperature ramp program indicated in Examples I, II and III.

A critical part of the phosphor preparation procedure is the citric acid mill/wash step. Although the overall reaction mechanism is designed to achieve essentially complete Mn$^{++}$ incorporation, trace amounts of unreacted manganese may persist. The mill/wash procedure is designed to dissolve and sequester any unreacted manganese which could contribute to discoloration of the phosphor and lower emission if not removed. In addition, the mill/wash step is designed to help deaggregate particle clusters and reduce the material to its fundamental particle size. A preferred concentration range for citric acid for use in the mill/wash is from about 0.2 to 0.4 weight percent per unit of phosphor powder.

Preferably, the method of preparation further includes the steps of:

rinsing the citric acid washed phosphor with ammonium hydroxide;

drying the rinsed phosphor; and sieving the dried material through, for example, a screen, having a mesh in the range of from about 200 to about 400.

The advantages derived from the incorporation of WO$_3$ in combination with the acid mill wash is clearly shown by the results shown in Table III. Table III compares lamp test data, phosphor texture and particle size for a phosphor prepared from zinc oxide, silicic acid (approx 87% SiO$_2$), and manganese (II) carbonate in the following relative mole amounts of 1.8852, 1.0000, 0.1147, and 0.0221, respectively. In samples G and I, which contained tungsten, tungsten is added in the relative mole amount of 0.0011 moles. The starting material for samples G–J were blended and fired in a manner similar to the blending and firing steps described in Example I, and the fired material was suspended in a citric acid solution and gently agitated therein. Samples I and J were further processed via the citric acid mill wash step as described in Example I.

TABLE III

| SAMPLE | W | FSSS | TEXTURE | LUMENS AT 0 HOURS |
|---|---|---|---|---|
| G | YES | 6.0 | POOR | — |
| H | NO | 5.2 | POOR | 3962 |
| I | YES | 5.2 | EXCELLENT | 5015 |
| J | NO | 5.0 | EXCELLENT | 4301 |

As used to describe texture in Table III, "poor" means an unacceptable mottled and/or spotty phosphor coating in a fluorescent lamp and "excellent" means an acceptable smooth, essentially blemish-free coating in a fluorescent lamp.

Individually coated phosphor particles of the substantially stoichiometric manganese-activated zinc orthosilicate phosphor, in accordance with the present invention have a continuous, i.e., nonparticulate; conformal; noncrystalline coating of aluminum oxide surrounding the outer surface of each phosphor particle. The coating substantially completely covers the outer surface of each coated particle. The thickness of the coating should be selected such that the performance of the phosphor is enhanced. Preferably, the aluminum oxide coating is at least 90 Angstroms. Most preferably, the coating thickness is from about 100 to about 300 Angstroms.

The individually and continuously coated phosphor particles of the present invention are prepared by depositing a continuous, nonparticulate; conformal, aluminum oxide coating on the outer surface of the individual phosphor particles. Such coating is applied by coating methods such as, for example, chemical vapor deposition or preferably chemical vapor deposition in a fluidized bed. Most preferably the continuously coated individual phosphor particles are prepared by the method described in U.S. Pat. No. 4,585,673, entitled "Method for Coating Phosphor Particles" by A. Gary Sigai which issued on Apr. 29, 1986, which is hereby incorporated herein by reference.

The following example is given to enable those skilled in this art to more clearly understand and practice the present invention. The example should not be considered as a limitation upon the scope of the invention but merely as being illustrative and representative thereof.

EXAMPLE V

A phosphor similar to that prepared and described in Example III was coated with a nonparticulate, conformal, continuous coating of aluminum oxide using the coating method of U.S. Pat. No. 4,585,673, prior to coating, the phosphor was admixed with an Aluminum Oxide C fluidizing aid (manufactured by DeGussa, Inc.). The admixture contained about 0.05 weight percent fluidizing aid with respect to the phosphor. Two hundred sixty grams of the admixture were loaded into the reactor. The coating method parameters were:

| | |
|---|---|
| Carrier Gas ($N_2$) | 500 cc/mm |
| Alkyl bubbler flow ($N_2$) | 150 cc/mm |
| Oxygen flow | 500 cc/mm |
| Oxygen Carrier ($N_2$) | 50 cc/mm |
| Hot zone (Highest temperature) | 500° C. |

The coating precursor material was trimethyl aluminum. The calculated aluminum oxide ($Al_2O_3$) coating thickness was about 100 Angstroms. Most preferred coating thicknesses are from about 100 to about 300 Angstroms. The surface area of the uncoated phosphor was about 0.39 meter$^2$/gram, which is within the preferred range of 0.31-0.39 meter$^2$/gram. High resolution SEM of coated phosphor particles shows that the aluminum oxide coating is conformal. The coating growth was enhanced where fluidizing aid particles had adhered to the phosphor particle surface during fluidizing and the coating process. Auger analysis confirmed complete coverage of the surface of the individual phosphor particles with the continuous aluminum oxide coating, within the limits of analysis (99.8%), based on the attenuation of the peak-to-peak height of the cations of the phosphor substrate.

"Continuous", as used herein to describe the aluminum oxide coating herein, means nonparticulate, i.e., the aluminum oxide coating surrounding each phosphor particle does not consist of individual aluminum oxide particles.

The key features of the aluminum oxide coated phosphor particles of the present invention are: (1) the continuous, or nonparticulate, nature of the coating on each particle; (2) the conformal nature of the coating on each particle, replicating submicron features found naturally occurring on the uncoated phosphor particles; and (3) that each phosphor particle is individually coated.

These key features of the coated phosphor particle of the present invention are established and/or supported by Scanning Electron Microscopy (SEM), Auger analysis, reflection electron diffraction techniques and BET measurements.

Scanning electron microscopy of the coated particles shows that the particles are individually coated; that the aluminum oxide coating on the phosphor particles is continuous and does not consist of aluminum oxide particles; and that the coating is conformal, replicating the submicron features of the underlying phosphor particle.

Auger analysis indicates that the coating provides substantially complete coverage of the outer surface of the phosphor particle.

Reflection electron diffraction shows the aluminum oxide coating to be noncrystalline, i.e., amorphous.

BET measurements support the conformal and continuous nature of the aluminum oxide coating to the extent the surface area of the coated phosphor is not appreciably changed when compared to the surface area of the uncoated phosphor. If the coating were particulate in nature, the surface area of the coated phosphor would be significantly increased. BET measurements also support that the phosphor particles are individually coated.

A fluorescent lamp in accordance with the present invention comprises a vitreous envelope having electrodes sealed into its ends, a fill of inert gas at low pressure, a small quantity of mercury, and a coating on the inner surface of the vitreous envelope. The coating comprises one or more layers of phosphor. Each layer of phosphor applied to the envelope contains at least one phosphor component. A phosphor which contains more than one phosphor component is more commonly referred to as a phosphor blend. At least one of the phosphor layers applied to the lamp envelope has a phosphor component comprising individually and continuously coated particles of the substantially stoichiometric manganese-activated zinc orthosilicate phosphor. The coated envelope is then processed into a finished lamp according to known techniques. In those lamps containing more than one phosphor layer, a layer containing the individually and continuously coated phosphor particles is preferably the last layer of phosphor applied to the lamp envelope, i.e., the layer directly adjacent to arc generating medium within the lamp.

As used herein, the term "fluorescent lamp" refers to any lamp containing a phosphor excited to fluorescence by ultra-violet radiation, regardless of configuration.

Referring now to the drawing of FIG. 1 there is shown with greater particularity one example of a fluorescent lamp 24 comprising a tubular, hermetically sealed, glass envelope 25. Electrodes 26 and 27 are sealed in the ends of envelope 25. Suitable terminals 28 and 29 are connected to the electrodes 26 and 27 and project from envelope 25. An arc generating and sustaining medium such as one or more inert gases and mercury vapor is included within envelope 25.

A coating 30 is applied to the inside surface of envelope 25. The coating 30 includes a phosphor layer comprising the coated phosphor particles of the present invention.

The coated phosphor particles of the present invention were incorporated into a 40 Watt T12 fluorescent lamp without conventional "milling", using wet-sieving techniques and an organic suspension system. The phosphor coating was applied to the inner surface of the lamp envelope and the lamp was otherwise processed using conventional lamp-processing techniques.

FIG. 2 graphically compares the lumen output for three 40 Watt T12 fluorescent lamps as a function of hours of lamp operation. Curve A corresponds to the performance of a lamp in accordance with the present invention, having a phosphor coating of substantially stoichiometric manganese-activated zinc orthosilicate phosphor, the individual particles of which are substantially completely coated with a nonparticulate, noncrystalline, conformal continuous aluminum oxide coating, similar to the phosphor prepared and described in Example III and coated in Example V. Curve B presents data for a lamp wherein the phosphor coating comprises uncoated substantially stoichiometric manganese-activated zinc orthosilicate phosphor, similar to the phosphor prepared and described in Example III. Curve C is data for a fluorescent lamp having a coating of standard commercial willemite phosphor (No. 2282 obtained from the Chemical and Metallurgical Division of GTE products Corporation, Towanda, Pa.) with an $Sb_2O_3$ additive which had been added to the phosphor slurry during lamp fabrication. All the lamps were evaluated at the same time in the same test series. The lamp test data for the coated phosphor of the present invention show a dramatically improved performance over the uncoated phosphor and standard commercial willemite.

Table IV (below) tabulates data for a test series comparing the performance of Phosphor No. 2285 (manufactured by GTE products Corporation, Towanda, Pa.) (hereinafter referred to as Lamp 1); Phosphor 2285, the particles of which have been individually coated with a continuous aluminum oxide coating (by a method similar to that of Example of V) (hereinafter referred to as Lamp 2); substantially stoichiometric manganese-activated zinc orthosilicate phosphor (similar to that of Example III) (hereinafter referred to as Lamp 3); and substantially stoichiometric manganese-activated zinc orthosilicate phosphor (similar to that of Example III) the particles of which have been individually coated with a continuous aluminum oxide coating (by a method similar to Example V) (hereinafter referred to as Lamp 4). The lamps used in the test series were 40 Watt T12 fluorescent lamps.

wherein:
$0.04 \leq x \leq 0.15$;
$0 \leq y \leq 0.05$; and
$0 \leq z \leq 0.002$,
the manganese-activated zinc orthosilicate phosphor particles being individually coated with a continuous coating of aluminum oxide.

As used herein, white as used to describe the light from a "white-emitting" phosphor blend refers to light falling within the white region of the CIE 1976 UCS Chromaticity Diagram, the approximate center of such white region having an Equal Energy point with the coordinates u'=0.2105 and v'=0.4737. The CIE 1976 UCS Chromaticity Diagram is shown in FIG. 3.

In preferred embodiments, the white light output of the white-emitting blend of the present invention falls on or close to the Black Body Locus. The Black Body Locus 40 is shown in FIG. 3. In most preferred embodiments, the white light output is at or near the Equal Energy point E, shown in FIG. 3.

In one embodiment of the white-emitting phosphor blend of the present invention, the blend includes the above-described green-emitting component and a red-emitting phosphor component, such as, for example, europium activated yttrium oxide. This two-component white-emitting phosphor blend of the present invention is used in high loaded fluorescent lamps, such as a T4 lamp, where the mercury discharge itself provides the blue component of the light to provide white light. The two-component white-emitting phosphor blend of the present invention comprises from about 55 to about 75 weight percent of a red-emitting phosphor component and from about 25 to about 45 weight percent of the above-described green-emitting component.

In accordance with another embodiment of the white-emitting blend of the present invention, there is provided a white-emitting tri-phosphor blend which includes a green-emitting phosphor component comprising the substantially stoichiometric manganese-activated zinc orthosilicate phosphor having the empirical formula set forth above, the individual particles of which have been coated with a continuous and confor-

TABLE IV

| Sample | LUMEN OUTPUT | | | | | | % Maint. 100–5000 | 8000 Hours | % Maint. 100–8000 |
| --- | --- | --- | --- | --- | --- | --- | --- | --- | --- |
| | 0 Hours | 100 Hours | 500 Hours | 1000 Hours | 2000 Hours | 5000 Hours | | | |
| Lamp 1 | 4745 | 4296 | 3634 | 3181 | 2784 | 2224 | 51.8 | * | * |
| Lamp 2 | 4696 | 4618 | 4558 | 4696 | 4415 | 4099 | 88.8 | 3933 | 85.2 |
| Lamp 3 | 4951 | 4554 | 3786 | 3283 | 2744 | 2140 | 47.0 | * | * |
| Lamp 4 | 5134 | 5040 | 4969 | 4860 | 4780 | 4498 | 89.2 | 4256 | 84.4 |

*No data available

Lamp 4, representative of a lamp in accordance with the present invention, provides a lamp with excellent maintenance characteristics and dramatically enhanced lumen output.

The coated phosphor particles of the present invention are particularly well-suited for use in a white-emitting phosphor blend. Such blends are used in fluorescent lamps. The white-emitting phosphor blend of the present invention comprises a green-emitting phosphor component, the green-emitting phosphor component comprising particles of manganese activated zinc orthosilicate phosphor having the empirical formula:

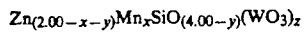

mal aluminum oxide coating. Such blend is less expensive than the tri-phosphor blend heretofore used in commercially available lamps. Preferably the triphosphor blend of the present invention is used in a two-coat fluorescent lamp, wherein a further advantage is realized. In two-coat lamps, a relatively inexpensive phosphor, such as, for example, a halophosphate phosphor, is used as the first phosphor layer and a second high-lumen phosphor layer is applied over the first phosphor layer. The second layer, or coat, is typically a blend of expensive narrow-band red, green, and blue-emitting phosphors (tri-phosphors) which give the desirable qualities of high brightness and excellent color rendition to the lamp. The amount of the tri-phosphor blend applied is generally between about 10% to 50% of the total combined phosphor weight of the two coats. Two-coat lamps which include the blend of the present invention as the second layer exhibit increased CRI (Color Rendition Index) values when compared with lamps made with a narrow-band expensive green-emitting phosphor component in the second layer of phosphor.

A series of lamp tests was conducted to compare the tri-phosphor blend of the present invention with the tri-phosphor blend which uses an expensive narrow-band, green-emitting rare-earth phosphor. The tests were conducted using fluorescent lamps of the configuration shown in FIG. 1. The sealed tube was filled with an inert gas at a low pressure (about 2 torr) and a quantity of mercury sufficient to provide a low vapor pressure of about six microns during operation. The interior of the glass envelope was coated with a first layer of a relatively inexpensive phosphor.

Two different systems were utilized in fabricating the lamps. In the first, a phosphor coating suspension was prepared by dispersing the phosphor particles in a water-base system employing polyethylene oxide and hydroxyethyl cellulose as the binders, with water as the solvent. The phosphor suspension was applied by known techniques, e.g., the phosphor suspension was caused to flow down the inner surface of the bulb and the water was evaporated leaving the binder and phosphor particles adhered to the bulb wall.

In the second system, the phosphor suspension was prepared by dispersing the phosphor particles in an organic base system with ethyl cellulose as the binder and xylol solvent. The phosphor suspension was applied to the bulb in the same manner used with the aqueous-base system.

The first phosphor layer was then baked to remove the organic components of the binder prior to overcoating with a second phosphor layer comprising the tri-phosphor blend of the present invention. The tri-phosphor blend included a narrow-band red and blue-emitting phosphor and substantially stoichiometric manganese-activated zinc orthosilicate phosphor, the individual particles of which have a continuous, conformal aluminum oxide coating thereon, as the green-emitting phosphor. The green-emitting component was similar to the phosphor prepared and described in Example III and coated by a method similar to that described in Example V. The two narrow-band phosphors used in the present test series were yttrium oxide activated by trivalent europium and having a peak emission at 611 nm and barium magnesium aluminate activated by divalent europium and having a peak emission at 45 nm.

The second phosphor layer comprising the blend of the present invention was applied from an organic base suspension by allowing the coating to flow down over the first phosphor layer until the phosphor coating drained from the bottom of the bulb indicating the coverage of the phosphor layer was complete. The double phosphor coated bulbs were then baked and processed into fluorescent lamps by conventional lamp manufacturing techniques.

Control lamps were fabricated by identical techniques. The control lamps, however, included a tri-phosphor blend having cerium terbium magnesium aluminate phosphor as the green-emitting phosphor component. The red-emitting and blue-emitting phosphor components of the blend were $Eu^{3+}$-activated yttrium oxide and $Eu^{2+}$-activated barium magnesium aluminate, respectively.

Two different lamp types were evaluated with a second layer comprising the white-emitting tri-phosphor blend of the present invention, with control lamps as described above. The results are summarized in Tables V and VI. In these Tables, comparisons have been made for light output (expressed in lumens), lumen maintenance, and CRI values.

The lamps used to obtain the data in Table V employed a first layer comprising about 89 weight percent cool white halophosphate phosphor (Type 4381 manufactured by GTE Products Corporation, Towanda, Pa.). The first layer was applied to the lamps of Table V using a water-base system. The lamps used to obtain the data in Table VI employed a first layer comprising warm white halophosphate phosphor. An organic-base system was used to apply the first layer to the lamps of Table VI.

The tests were run by photometering the lamps for light output in a standard photometric sphere, both initially and at the stated times. Lamp color values were obtained by spectral power distribution (SPD) measurements. (The lamps were 40 T12 fluorescent lamps.)

The objective of the test in Table V was to determine the effect of replacing the narrow-band green emitting magnesium aluminate phosphor with the broader-band coated green phosphor of the present invention in the tri-phosphor blend for double coated lamps. The lamps of Table V had a tri-phosphor weight in the second layer of about 10% of the total phosphor in the two layers. The lamps were fabricated to obtain the same x and y color coordinates and color temperature for both the test and control by adjusting the tri-phosphor blend composition. The results show a substantial improvement in CRI of about 6 units for lamps including the blend of the present invention over the control lamps at approximately the same tri-phosphor weights in the second layers. Lumens and lumen maintenance differences were slight between the two test groups.

In another example reported in Table VI. lamps were prepared in a similar manner as described for the lamps of Table V, except that the tri-phosphor weight in the second layer was about 35% to 40% of the total phosphor in both layers. The results again show the beneficial effect of the present invention based on the higher CRI value of 86.0 in comparison to the control CRI of 77.1. This was accomplished without adversely affecting the lumens and lumen maintenance initially and after 1,000 hours of lamp operation.

TABLE V

| COMPOSITION SECOND LAYER TRI-PHOSPHOR* | TRI-PHOSPHOR WEIGHT | COLOR MEASUREMENTS | | | |
|---|---|---|---|---|---|
| | | COLOR COORDINATES | | | |
| | | X | Y | COLOR TEMP. | CRI |
| CONTROL | 0.73 grams | .383 | .389 | 3921° K. | 71.9 |
| 48.6% RED - $Y_2O_3$:Eu | | | | | |
| 40.4% GREEN - (Ce, Tb) Mg AlO:Ce:Tb | | | | | |
| 11.0% BLUE - Ba Mg AlO:Eu | | | | | |
| TEST | 0.76 grams | .383 | .388 | 3928° K. | 78.2 |

TABLE V-continued 49.5% RED - Y₂O₃:Eu
36.5% GREEN - Zn₂ SiO₄:Mn (CVD Al₂O₃ coated)
14.0% BLUE - Ba Mg AlO:Eu

| | PHOTOMETRIC RESULTS | | | LUMEN MAINTENANCE % |
|---|---|---|---|---|
| | LUMENS 0 HOUR | LUMENS 100 HOUR | LUMENS 1,000 HOURS | 100-1,000 HOURS |
| CONTROL | 2930 | 2840 | 2744 | 96.6 |
| TEST | 2864 | 2787 | 2658 | 95.4 |

*Lamp Type: 40T12 Lite White Deluxe Super Saver 34

TABLE VI

| COMPOSITION-SECOND LAYER TRI-PHOSPHOR* | TRI-PHOSPHOR WEIGHT | COLOR MEASUREMENTS | | | |
|---|---|---|---|---|---|
| | | COLOR COORDINATES | | | |
| | | X | Y | COLOR TEMP. | CRI |
| CONTROL | 1.95 GRAMS | .441 | .411 | 2900° K. | 77.1 |
| 64.1% RED - Y₂O₃:Eu | | | | | |
| 33.3% GREEN - (Ce, Tb) Mg AlO:Ce:Tb | | | | | |
| 2.6% BLUE - Ba Mg AlO:Eu | | | | | |
| TEST | 1.73 GRAMS | .437 | .411 | 2976° K. | 86.0 |
| 65.3% RRD - Y₂O₃:Eu | | | | | |
| 31.4% GREEN - Zn₂ SiO₄:Mn (CVD Al₂O₃ COATED) | | | | | |
| 3.3% BLUE - Ba Mg AlO:Eu | | | | | |

| | PHOTOMETRIC RESULTS | | | LUMEN MAINTENANCE % |
|---|---|---|---|---|
| | LUMENS 0 HOUR | LUMENS 100 HOUR | LUMENS 1,000 HOURS | 100-1,000 HOURS |
| CONTROL | 3494 | 3389 | 3312 | 97.7 |
| TEST | 3452 | 3360 | 3297 | 98.1 |

*Lamp Type: 40T12 3K.° Royal White

These results clearly show the substantial improvement in CRI provided by using the blend of the present invention in fluorescent lamps.

Moreover, the invention also provides a substantial phosphor cost savings in the above examples since the cost of the green magnesium aluminate phosphor is about 15 times greater than the coated phosphor of the present invention. Since the green emitting phosphor component comprises about 30% to 40% of the tri-phosphor blend, it is evident that fluorescent lamps will benefit greatly from the use of the coated phosphor of the present invention by permitting a lamp price that finds more acceptance in the marketplace.

While the fluorescent lamp type used in the above-described lamp tests was 40T12, it will be appreciated by those of ordinary skill in the art that fluorescent lamps having different diameters, loadings, wattages and voltages can also be used in performing and obtaining the benefits and advantages of the present invention.

While there have been shown what are at present considered to be the preferred embodiments of the invention, it will be apparent to those skilled in the art that various changes and modifications can be made herein without departing from the scope of the invention as defined by the appended claims.

What is claimed is:

1. A method for preparing a manganese-activated zinc orthosilicate phosphor particle having a nonparticulate, conformal aluminum oxide coating, said phosphor particle having the empirical formula:

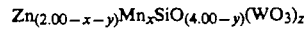

$$Zn_{(2.00-x-y)}Mn_xSiO_{(4.00-y)}(WO_3)_z$$

wherein:
$0.04 \leq x \leq 0.15$;
$0 \leq y \leq 0.05$; and
$0 \leq z \leq 0.002$, wherein all of said manganese activator is present as manganese (II) and occupies zinc (II) sites whereby said phosphor particle has improved white bodied coloration and improved brightness due to the absence of unreacted manganese containing second phases which result in discoloration and reduced brightness, comprising the steps of:

blending a zinc source, a manganese (II) source, a silicon source, and a tungsten source in amounts in accordance with said formula with NH₄Cl and NH₄F in an amount of up to about 2 weight percent NH₄Cl and up to about 0.2 weight percent NH₄F to form a relatively uniform admixture, said zinc source consisting essentially of zinc oxide or zinc carbonate, said manganese source consisting essentially of manganese (II) oxide or manganese (II) carbonate, said silicon source consisting essentially of silicic acid, and said tungsten source consisting essentially of tungsten trioxide;

firing said admixture in a closed container under an inert non-oxidizing atmosphere to promote retention of manganese in the plus two valance state whereby oxidation of manganese to a higher valence state is avoided wherein the NH₄Cl and NH₄F being in a amount sufficient to purge the closed container of residual air and/or O₂ and the NH₄F being in an amount sufficient to effect a larger size phosphor particle than said method absent NH₄F, said firing comprising increasing the temperature from about 700 degrees Centigrade to about 1250 degrees Centigrade over a time period of about 30 minutes, heating the admixture at a temperature of about 1250 degrees Centigrade for about 2 to about 3 hours, and decreasing the temperature to about 700 degrees Centigrade over a time period of about one hour to form a phosphor particle containing substantially all of said manganese in the plus two valance state and including unreacted manganese;

milling and washing said phosphor particle in an aqueous citric acid solution to remove substantially all of said unreacted manganese to form said phosphor particle, said citric acid solution comprises from about 0.2 to about 0.4 weight percent citric acid;

rinsing the citric acid washed phosphor particle with ammonium hydroxide;

drying the rinsed phosphor particle; and sieving the dried phosphor particle through a 200-mesh to 400-mesh screen;

and depositing a continuous nonparticulate, conformal aluminum oxide coating on said dried phosphor particle.

2. A method for preparing a phosphor particle in accordance with claim 1 wherein:

x is from about 0.11 to about 0.12;
y is from about 0 to about 0.03; and
z is from about 0 to about 0.002.

3. A method for preparing a phosphor particle in accordance with claim 2 wherein said aluminum oxide coating has a thickness in the range of about 100 to about 300 Angstroms.

4. A method for preparing a phosphor particle in accordance with claim 1 wherein said phosphor particle has the empirical formula:

$$Zn_{1.89}Mn_{0.11}SiO_4(WO_3)_{0.001}.$$

5. A method for preparing a phosphor particle in accordance with claim 4 wherein said aluminum oxide coating has a thickness of about 100 Angstroms.

6. A method for preparing a phosphor particle in accordance with claim 1 wherein said aluminum oxide coating has a thickness of at least about 90 Angstroms.

7. A method for preparing a phosphor particle in accordance with claim 1 wherein said ammonium chloride is present in said admixture in an amount from about 0.5 to about 1.0 weight percent.

8. A method for preparing a phosphor particle in accordance with claim 1 wherein said ammonium fluoride is present in an amount from about 0.02 to about 0.06 weight percent.

9. A method for preparing a phosphor particle in accordance with claim 8 wherein said ammonium chloride is present in an amount from about 0.5 to about 1.0 weight percent.

10. A method for preparing a phosphor particle in accordance with claim 1 wherein said phosphor particle has an Fisher Sub-Sieve Size particle size in the range of from about 5 micrometers to about 6 micrometers.

11. A method for preparing a phosphor particle in accordance with claim 1 wherein said depositing of a continuous, nonparticulate, conformal aluminum oxide coating on said dried phosphor particle is by chemical vapor deposition in a fluidized bed.

12. A method for preparing a phosphor particle in accordance with claim 11 wherein said aluminum oxide coating coating has a thickness of from about 300 Angstroms.

* * * * *